US008707395B2

(12) United States Patent
Sahay et al.

(10) Patent No.: US 8,707,395 B2
(45) Date of Patent: Apr. 22, 2014

(54) TECHNIQUE FOR PROVIDING SECURE NETWORK ACCESS

(75) Inventors: Vasant Sahay, Sunnyvale, CA (US); Biju Sajibhavan, Cupertino, CA (US); Nirmalendu Das, Cupertino, CA (US); Subhasree Mandal, San Jose, CA (US); David Burton Levi, Knoxville, TN (US); Manoj Kumar Guglani, Fremont, CA (US); Philippe Michelet, Milpitas, CA (US); Ravi Chakravarthi Kumar, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 1086 days.

(21) Appl. No.: 11/320,603

(22) Filed: Dec. 30, 2005

(65) Prior Publication Data

US 2007/0011725 A1 Jan. 11, 2007

Related U.S. Application Data

(60) Provisional application No. 60/698,053, filed on Jul. 11, 2005.

(51) Int. Cl.
*H04L 29/06* (2006.01)
*G06F 15/16* (2006.01)
*G06F 21/00* (2013.01)
*H04W 12/06* (2009.01)

(52) U.S. Cl.
CPC .......... *H04L 63/105* (2013.01); *H04L 63/0272* (2013.01); *G06F 21/00* (2013.01); *H04W 12/06* (2013.01); *H04L 63/145* (2013.01)
USPC ............................................................ 726/4

(58) Field of Classification Search
USPC ............... 726/2–4, 16, 17, 21, 26–29; 380/59
See application file for complete search history.

(56) References Cited

U.S. PATENT DOCUMENTS

| 7,178,166 | B1 * | 2/2007 | Taylor et al. ..................... 726/25 |
| 7,477,747 | B2 * | 1/2009 | Stieglitz et al. ............... 380/270 |
| 7,627,123 | B2 * | 12/2009 | Conway et al. ............... 380/270 |
| 2002/0069278 | A1 * | 6/2002 | Forslow ........................ 709/225 |
| 2004/0078597 | A1 * | 4/2004 | Sun et al. ...................... 713/201 |
| 2006/0177063 | A1 * | 8/2006 | Conway et al. ............... 380/270 |
| 2006/0179307 | A1 * | 8/2006 | Stieglitz et al. ............... 713/168 |
| 2006/0242685 | A1 * | 10/2006 | Heard et al. ..................... 726/3 |

FOREIGN PATENT DOCUMENTS

| EP | 1 339 199 A1 | 8/2003 |
| EP | 1339199 A1 * | 8/2003 |
| WO | WO 99/65207 A1 | 12/1999 |
| WO | WO 9965207 A1 * | 12/1999 |

* cited by examiner

*Primary Examiner* — Philip Chea
*Assistant Examiner* — Fatoumata Traore
(74) *Attorney, Agent, or Firm* — Anderson Gorecki & Rouille LLP (57) ABSTRACT

A technique for providing secure network access is disclosed. In one particular exemplary embodiment, the technique may be realized as a method for providing secure network access. The method may comprise establishing a plurality of access zones in a network, wherein client devices assigned to different access zones have different access privileges and are isolated from one another. The method may also comprise assigning a client device to one of the plurality of access zones based on an assessment of a security context associated with the client device and a connection of the client device to the network.

23 Claims, 4 Drawing Sheets

TECHNIQUE FOR PROVIDING SECURE NETWORK ACCESS

CROSS-REFERENCE TO RELATED APPLICATIONS

This patent application claims priority to U.S. Provisional Patent Application No. 60/698,053, filed Jul. 11, 2005, which is hereby incorporated by reference herein in its entirety.

This patent application is related to U.S. patent application Ser. No. 11/320,593, entitled "Technique for Authenticating Network Users," filed Dec. 30, 2005, which is incorporated herein in its entirety.

FIELD OF THE DISCLOSURE

The present disclosure relates generally to network security and, more particularly, to a technique for providing secure network access.

BACKGROUND OF THE DISCLOSURE

Network security has become a great concern for network operators. In light of ongoing proliferation of security attacks by hackers and/or malicious programs (e.g., viruses and worms), many network operators are scrambling for security solutions to fend off unauthorized intrusions. Unfortunately, security measures in existing network architectures are often ineffective against incessant waves of security attacks that are becoming more sophisticated and more damaging. For example, many traditional methods for network access control only focus on user authentication (typically password-based), but tend to ignore a user's security context. Upon passing a simple user authentication, a client device may be permitted to access a network even if the client device lacks an updated security patch or has already been infected by viruses or worms. Such a client device can quickly infect other vulnerable devices in the network or be used by hackers to attack other networks. In addition, existing networks often lack effective countermeasures against potential security threats or existing breaches. Once a corrupted device is attached to a network, no systematic approach is available to detect the corrupted device or to prevent it from compromising the security of the entire network.

In view of the foregoing, it would be desirable to provide a network security solution which overcomes the above-described inadequacies and shortcomings.

SUMMARY OF THE DISCLOSURE

A technique for providing secure network access is disclosed. In one particular exemplary embodiment, the technique may be realized as a method for providing secure network access. The method may comprise establishing a plurality of access zones in a network, wherein client devices assigned to different access zones have different access privileges and are isolated from one another. The method may also comprise assigning a client device to one of the plurality of access zones based on an assessment of a security context associated with the client device and a connection of the client device to the network.

In accordance with other aspects of this particular exemplary embodiment, the method may further comprise applying a filter to network traffic associated with the client device based at least in part on the access zone the client device is assigned to.

In accordance with further aspects of this particular exemplary embodiment, the method may further comprise reassigning the client device to another access zone in response to one or more triggering events, wherein the one or more triggering events are selected from a group consisting of: a change in the security context; a security violation associated with the client device; a security violation detected in the network; and an operator-initiated request to reassign the client device to another access zone.

In accordance with additional aspects of this particular exemplary embodiment, the method may further comprise changing, based on a further assessment of the security context, a filter applied to network traffic associated with the client device without reassigning the client device to another access zone if the client device has a static Internet Protocol (IP) address. And, the method may comprise assigning an Internet telephone device to all voice-over-IP (VoIP) virtual local area networks (VLANs) in the network and maintaining the assignment.

In accordance with another aspect of this particular exemplary embodiment, the assessment of the security context may be performed at least in part by an agent program in the client device.

In accordance with yet another aspect of this particular exemplary embodiment, the plurality of access zones are selected from a group consisting of: at least one first access zone for client devices that are not been authenticated; at least one second access zone for client devices that are authenticated but not fully trusted; and at least one third access zone for client devices that are authenticated and fully trusted. The client device may be only permitted to access an authentication server if the client device is assigned to the at least one first access zone. Network traffic associated with the client device may be filtered for remediation messages only, if the client device is assigned to the at least one second access zone. The client device may be granted access to the network based on a user profile, if the client device is assigned to the at least one third access zone.

In accordance with still another aspect of this particular exemplary embodiment, the client device may connect to the network via a network element that is controlled by an access controller, and the access controller may maintain a persistent connection with the network element, thereby facilitating a prompt assignment or reassignment of the client device to one of the plurality of access zones. The network may be a virtual private network, and each of the plurality of access zones is a virtual local area network (VLAN).

In accordance with a further aspect of this particular exemplary embodiment, the method may comprise causing the client device to obtain a network address based on the access zone the client device is assigned to. The method may comprise: blocking the client device's requests for any new network address, causing the client device to initiate a request for a new network address and to retry the request upon rejection, associating the new network address with the access zone the client device is assigned to, and allowing the client device's request for the new network address to proceed.

In another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by at least one processor readable carrier for storing a computer program of instructions configured to be readable by at least one processor for instructing the at least one processor to execute a computer process for performing the method as recited.

In still another particular exemplary embodiment, the technique may be realized as a system for providing secure network access. The system may comprise an access controller and at least one access device coupled to a network. The access controller may establish a plurality of access zones in the network, wherein client devices assigned to different access zones have different access privileges and are isolated from one another. A client device may connect to the network through the at least one access device. And, the access controller may coordinate with the at least one access device to assign the client device to one of the plurality of access zones based on an assessment of a security context associated with the client device and the client device's connection to the network.

In accordance with other aspects of this particular exemplary embodiment, the access controller may cause a filter to be applied to network traffic associated with the client device based at least in part on the access zone the client device is assigned to.

In accordance with further aspects of this particular exemplary embodiment, the access controller may maintain a persistent connection with the network element, thereby facilitating a prompt assignment or reassignment of the client device to one of the plurality of access zones.

In accordance with additional aspects of this particular exemplary embodiment, the network may be a virtual private network, and each of the plurality of access zones may be a virtual local area network (VLAN).

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

According to embodiments of the present disclosure and the related patent application, two mechanisms may be implemented in a network to provide secure network access: (1) a proactive mechanism to grant network access only to client devices that are found to be safe, and (2) a reactive mechanism to detect a corrupted or noncompliant device and to quickly isolate it from the rest of the network. These two security mechanisms may be preferably combined for a desired defense against security attacks.

The proactive mechanism may be embodied in a user authentication technique as described in the related patent application. According to embodiments of this user authentication technique, a network user can be authenticated not only based on a user-provided security identifier but also based on a security context associated with the user's device ("client device") and the network. For example, an agent program known as a "Tunnel Guard" may be downloaded to the client device, wherein the Tunnel Guard may interact with the network to evaluate the relevant security context. Based on the evaluation of the security context, it may be determined whether the client device can be allowed to access the network and what access privileges the client device can have. In addition, multiple authentication schemes, including the "Tunnel Guard" method, may be implemented on a same physical port or access device. When a client device attempts a connection with the network, an appropriate authentication scheme may be dynamically selected and executed based on the client device's type and behavior.

The reactive mechanism may be implemented by enforcing a plurality of access zones (e.g., virtual local area networks or VLANS) within a network, wherein member devices in one access zone may be isolated from those in another access zone. During and after authentication, a client device may be assigned to different access zones depending on the authentication progress and/or a relevant security context. Based on authentication results as well as changes in the security context, the client device may be moved from one access zone to another. Network traffic associated with the client device may be further restricted with one or more filters.

For illustration purposes, embodiments of the present disclosure are described below with references to specific communication protocols, such as, for example, Internet Protocol (IP), Dynamic Host Configuration Protocol (DHCP), Address Resolution Protocol (ARP), Hyper Text Transfer Protocol (HTTP), and HTTP over Secure Socket Layer (HTTPS). It should be noted, however, that the present disclosure is not limited to these specific examples but may be adapted to operate with other communication protocols.

As used herein, the term "network" refers to one or more interconnected devices, such as routers, switches and servers. In most instances, a network includes a plurality of interconnected devices that form, for example, one or more local area networks (LANs) and/or wide area networks (WANs). According to some embodiments, the technique for providing secure network access may be preferably implemented in an enterprise network such as a virtual private network (VPN).

Figure 1:
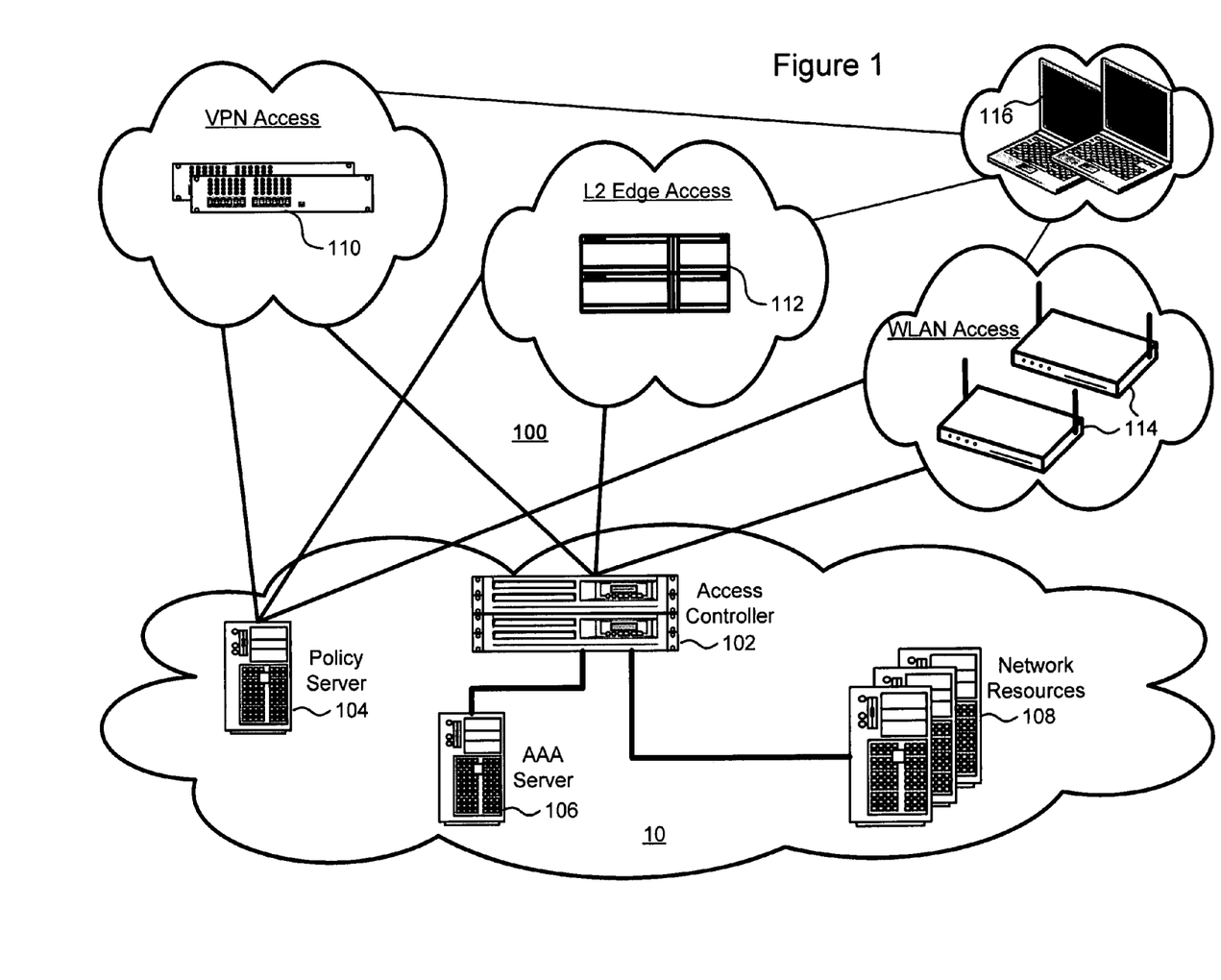
FIG. 1 shows a block diagram illustrating an exemplary system for providing secure network access in accordance with an embodiment of the present disclosure.

Referring to FIG. 1, there is shown a block diagram illustrating an exemplary system 100 for providing secure network access in accordance with an embodiment of the present disclosure. The system 100 may comprise a network 10 in which an access controller 102, a policy server 104 and an "AAA" (authentication, authorization and accounting) server 106 may facilitate secure access to network resources 108. Although shown as separate network elements, some or all of the functionalities associated with these network devices may be combined in a single device or rearranged among multiple devices. One or more client devices 116 may access the network 10 via one or more access devices such as VPN switches 110, L2 edge switches 112, and/or wireless local area network (WLAN) routers 114. Although shown as notebook computers in FIG. 1, the client devices 116 may include any type of electronic device capable of network access, such as, for example, personal computers (PC's), UNIX terminals, computer servers, personal digital assistant (PDA) devices, Internet telephones, or mobile telephones.

The access controller 102 may be a server or similar device that provides a centralized control of secured network access. In FIG. 1, the access controller 102 is shown as positioned "in line" (i.e., in a data path between client devices 116 and the network resources 108). However, according to some embodiments, the access controller 102 does not have to sit in line, but may be located anywhere in the network 10 or even remotely, for example, in a relatively large network.

This centralized approach may be accommodated with a captive web portal. When the access controller 102 is in the data path between a client device 116 and the network 10, spoofed ARP or IP packets may be utilized to bring HTTP or HTTPS requests to the access controller 102. If, however, the access controller 102 is not in the data path (e.g., multiple hops away), any unauthorized request from the client devices 116 to the network resources 108 may be redirected to an authentication page served by a captive web portal. Unlike traditional captive web portals, this captive web portal may be positioned anywhere in the network 10. A domain name service (DNS) server may be configured for the captive web portal, wherein the DNS server may be set to "forward only" when client requests are directed to a predetermined list of hosts ("Exclude List"). The DNS server may also resolve unknown names to a fixed IP address. Therefore, if a DNS server configured on a client device 116 points to a DNS server in a captive web portal, all unauthorized and/or unresolved client requests may be forced to a centralized authentication page.

In addition to the centralized approach, the access controller 102 may also support "ubiquitous access." Instead of being specific to any access technology employed by the client devices 116, the access controller 102, as a single and unique verification point for the entire network 10, may be independent of user locations (e.g., local or remote), security standards (e.g., IPsec or SSL), client device types (e.g., PC, telephone or PDA) or operation systems, or connectivity types (e.g., fixed/Ethernet or wireless/mobile), wherein IPsec is short for Internet Protocol Security and SSL is short for Secure Socket Layer. That is, the control of secure network access may be "virtualized." No matter what variety of access technologies are employed by the client devices 116, it may no longer be necessary, as in traditional networks, to set up multiple switches each of which accommodates one specific access technology.

When a client device 116 physically or wirelessly connects to an access device (e.g., VPN switches 110, L2 edge switches 112, or WLAN routers 114), the access controller 102 may coordinate with the access device to assign the client device 116 to one of a plurality of access zones depending on, for example, whether the client device 116 is successfully authenticated and whether it passes a security assessment. Members in different access zones may have different access privileges and may be isolated from one another. These zone-specific access privileges may be enforced by the policy server 104. In each access zone, the policy server 104 may also apply one or more zone-specific filters to network traffic associated with member devices in that access zone. In addition, the AAA server 106 may provide backend authentication services based on standards such as Remote Authentication Dial In User Server (RADIUS) protocol and/or Lightweight Directory Access Protocol (LDAP).

In order for a virtually centralized access controller to quickly and securely assign or reassign a client device to its appropriate access zones, it may be desirable for the access controller 102 to communicate quickly and securely with an access device that the client device is connected to. It may be also desirable for the access controller 102 to have specific knowledge of an access device and its access zone configurations. In a network outage, it may be desirable for the access controller 102 to quickly re-acquire the access device's configuration. For these purposes, a protocol may be implemented between the access controller 102 and access devices. As one example, FIG. 2 shows a block diagram illustrating an exemplary network architecture to facilitate secure network access in accordance with an embodiment of the present disclosure.

Figure 2:
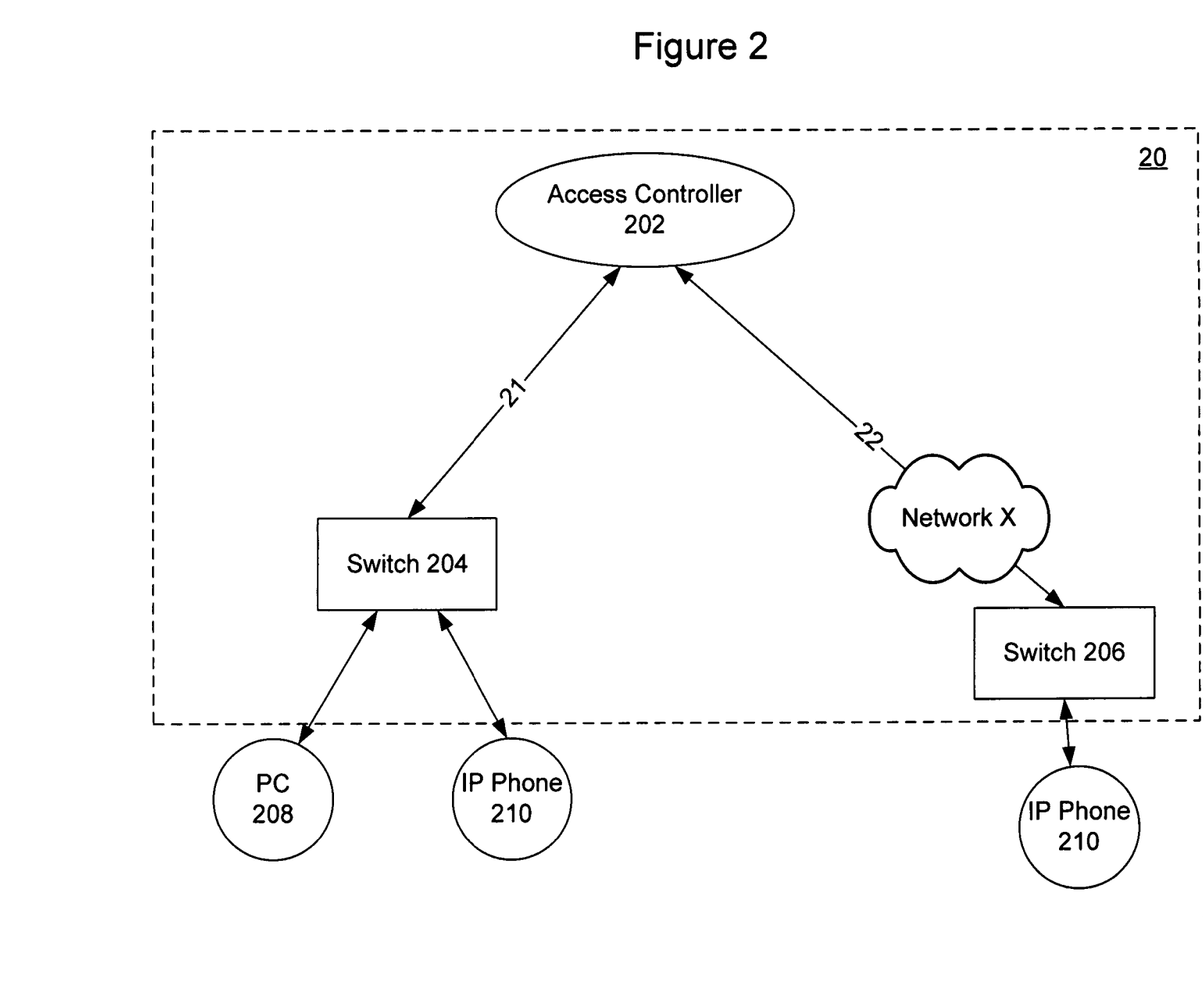
FIG. 2 shows a block diagram illustrating an exemplary network architecture to facilitate secure network access in accordance with an embodiment of the present disclosure.

As shown in FIG. 2, an access controller 202 may maintain a persistent, secure connection with each access device in a network 20. For example, a persistent connection 21 may be maintained directly with a switch 204, and another persistent connection 22 may be maintained indirectly, for example, through an intermediate network 205, with a switch 206. The intermediate network 205 may or may not be a part of the network 20. The switches 204 and 206 may each provide access ports to client devices, such as an PC 208 and IP telephones 210. The persistent connections 21 and 22 may secure signals transmitted therein with, for example, Secure Shell (SSH) encryption. To control secure access by a client device (e.g., PC 208), the access controller 202 may communicate with the switch 204 based on a protocol known as "SSCP." When the PC 208 requests access to the network, or upon any change in authentication or security assessment of the PC 208, the switch 204 may immediately notify the access controller 202 and provide it with an update of current configuration of the switch 204. Due to the persistent SSH connection 21, the access controller 202 may rapidly and securely respond to the switch 204 with instructions of access zone assignment. If the connection 21 ever fails, for example, due to a network outage, the SSCP protocol may cause a new persistent connection to be re-established between the access controller 202 and the switch 204. Upon recovery of the connection 21, the switch 204 may immediately provide an update to the access controller 202.

Figure 3:
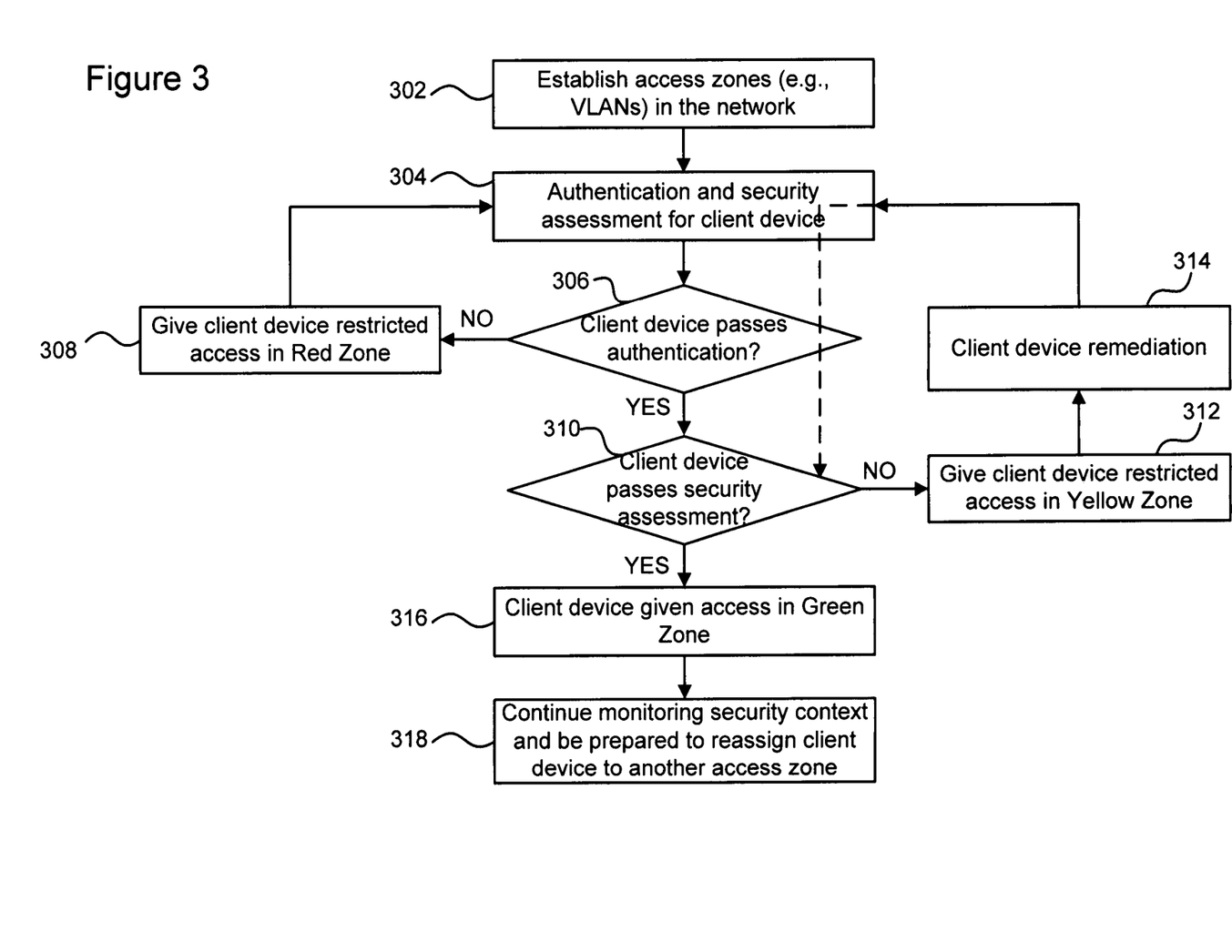
FIG. 3 shows a flow chart illustrating an exemplary method for providing secure network access in accordance with an embodiment of the present disclosure.

Referring now to FIG. 3, there is shown a flow chart illustrating an exemplary method for providing secure network access in accordance with an embodiment of the present disclosure.

In step 302, a plurality of access zones may be established in a network. These access zones may be implemented based on a plurality of VLANs and an access control list (ACL). Each VLAN may have one or more client devices as its members. A client device that belongs in a particular VLAN may, for example, have an IP address within that VLAN's IP subnet. Client devices with membership in one VLAN may be logically isolated from those with membership in another VLAN. Client devices with membership in a same VLAN may or may not be permitted to communicate with one another.

In step 304, a client device that attempts to access the network may be authenticated, and a security assessment may be performed on the client device. The authentication may be based on any of a number of mechanisms including the "Tunnel Guard" method. The security assessment may be preferably performed by an agent program (e.g., the "Tunnel Guard" or similar) that an access device may download to the client device. The agent program may check the client device for one or more security issues such as system integrity and software compliances. For example, the agent program may scan the client device for viruses or worms, and the agent program may verify whether the client device has installed the most recent security patches or antivirus definitions.

In step 306, it may be determined whether the client device has passed authentication. If the client device has not been successfully authenticated, then, in step 308, it may be assigned to a VLAN called "Red Zone" or "Authentication VLAN," wherein the client device is given access only to the access controller. In addition, one or more so-called "Red" filters may be applied to the client device to limit its traffic to those necessary for authentication purposes. According to some embodiments, any client device may be initially assigned to the Red Zone by default until it passes authentication.

If the client device has been authenticated, then, in step 310, it may be determined whether the client device has passed the security assessment. If not, then, in step 312, the client device that is currently in the Red Zone may be reassigned to a VLAN called "Yellow Zone" or "Remediation VLAN," wherein the client device has restricted access to a remediation network only. One or more so-called "Yellow" filters may now be applied to the client device to limit its traffic to those needed for remediation purposes. In step 314, the client device may be subject to remediation such as downloading security patches and updating antivirus definitions. The client device may undergo another security assessment in step 304 and go through remediation again until it is deemed safe to the network.

If the client device has passed both the authentication and the security assessment, then, in step 316, the client device may be assigned to a VLAN called "Green Zone," wherein the client device may have less restricted access to the network resources. However, one or more so-called "Green" filters may be applied to the client device to limit its traffic, for example, according to the client device's specific access privileges.

In step 318, the client device may continue to be monitored for its security context, and the access controller may reassign the client device to another access zone or VLAN based on one or more triggering events. The triggering events may include, for example, a change in the security context, a security violation by the client device, a security violation detected in the network, and an operator-initiated request to reassign the client device.

There may be client devices (e.g. network printers) that have statically configured IP address. To accommodate their static IP addresses, VLAN membership of these client devices may be kept constant while traffic filters (e.g., Red, Yellow and Green) may be dynamically applied to these client devices. For example, when such a client device has met the criteria to be moved from the Red Zone to the Yellow Zone, Red filters formerly applied to the client device may be dropped and Yellow filters may be applied instead. For client devices with static IP addresses, the authentication may be done based on their media access control (MAC) addresses.

Internet telephone devices or IP phones may be restricted to voice-over-IP (VoIP) VLANs and may only engage in pre-specified types of communication. Thus, an Internet telephone device may be configured as always a member of all VoIP VLANs, and traffic filters may be applied to the Internet telephone device, for example, to limit its traffic to VoIP messages.

Figure 4:
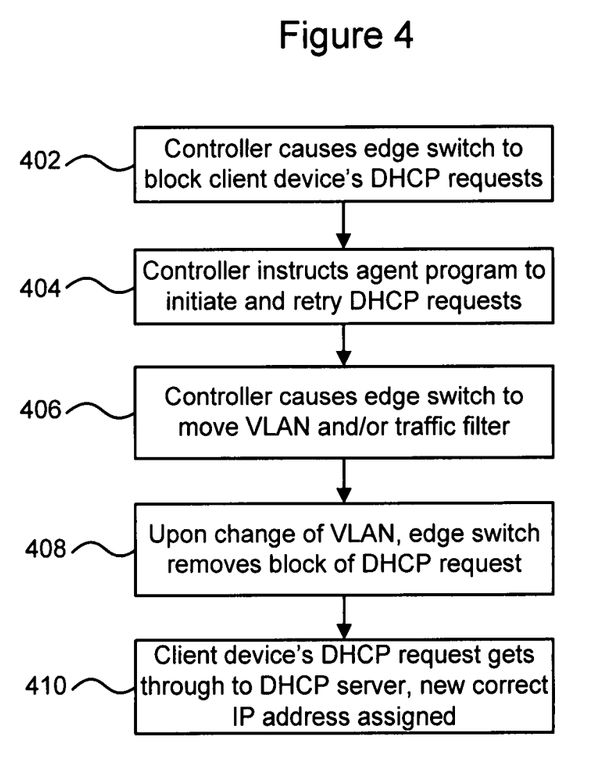
FIG. 4 shows a flow chart illustrating an exemplary method for changing a client device's VLAN membership in accordance with an embodiment of the present disclosure.

Every time a client device is moved to a new VLAN, the subnet on the new VLAN may be different from the client device's previous VLAN. As a result, the IP address that the client device previously had may not be usable in the new VLAN. The client may therefore need a new IP address in the new VLAN (subnet). Since the client device on its own may not realize that it needs to renew its IP address, it may be desirable to employ an agent program in the client device to renew its IP address. One exemplary mechanism is illustrated in FIG. 4, wherein a network's access controller causes a client device to renew its IP address upon a change in VLAN membership. The client device may be connected to an edge switch that in turn communicates with the access controller.

In step 402, before moving the client device to a new VLAN, the access controller may first cause the edge switch to block the client device's requests to renew its own IP address. The requests may be directed at a DHCP server in the network. Blocking of the DHCP requests may be beneficial since it may prevent a race condition wherein the client device, on its own initiative, renews its IP address before moving to a new VLAN—leading to a deadlock.

In step 404, the access controller may instruct the agent program (in the client device) to initiate DHCP requests. Since the edge switch is blocking the DHCP requests, the client device may keep on resending the DHCP requests.

In step 406, the access controller may cause the edge switch to move VLAN and/or traffic filters associated with the client device.

In step 408, the edge switch may stop blocking the client device's DHCP requests.

In step 410, the client device's DHCP request may finally getting through the edge switch and reach the DHCP server. When the DHCP server replies, the client device may be assigned a new, correct IP address (in the new VLAN subnet).

At this point it should be noted that the technique for providing secure network access in accordance with the present disclosure as described above typically involves the processing of input data and the generation of output data to some extent. This input data processing and output data generation may be implemented in hardware or software. For example, specific electronic components may be employed in a computer or communications network or similar or related circuitry for implementing the functions associated with secure network access in accordance with the present disclosure as described above. Alternatively, one or more processors operating in accordance with stored instructions may implement the functions associated with secure network access in accordance with the present disclosure as described above. If such is the case, it is within the scope of the present disclosure that such instructions may be stored on one or more processor readable storage media (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for providing secure network access comprising the steps of:

establishing a plurality of access zones in a network, wherein client devices assigned to different access zones have different access privileges and are isolated from one another, wherein the plurality of access zones are selected from a group consisting of:
at least one first access zone for client devices that have not been authenticated;
at least one second access zone for client devices that are authenticated but not fully trusted; and
at least one third access zone for client devices that are authenticated and fully trusted; and
assigning a client device to one of the plurality of access zones based on an authentication of the client device, an assessment of a security context associated with the client device, and a connection of the client device to the network, wherein the assessment of the security context is performed at least in part by an agent program in the client device to determine an access privilege of the client device and the assessment of the security context is performed prior to the authentication of the client device, and wherein network traffic associated with the client device is filtered for remediation messages only if the client device is assigned to the at least one second zone, wherein said remediation messages comprise security patches and antivirus definitions.

2. The method according to claim 1, further comprising:
applying a filter to network traffic associated with the client device based at least in part on the access zone the client device is assigned to.

3. The method according to claim 1 further comprising:
reassigning the client device to another access zone in response to one or more triggering events, wherein the one or more triggering events are selected from a group consisting of:
a change in the security context;
a security violation associated with the client device;
a security violation detected in the network; and
an operator-initiated request to reassign the client device to another access zone.

4. The method according to claim 1 further comprising:
changing, based on a further assessment of the security context, a filter applied to network traffic associated with the client device without reassigning the client device to another access zone if the client device has a static Internet Protocol (IP) address.

5. The method according to claim 1, further comprising:
assigning an Internet telephone device to all voice-over-IP (VOIP) virtual local area networks (VLANs) in the network; and maintaining the assignment.

6. The method according to claim 1, wherein the agent program in the client device is downloaded to the client device.

7. The method according to claim 1, wherein the client device is only permitted to access an authentication server if the client device is assigned to the at least one first access zone.

8. The method according to claim 1, wherein the client device is granted access to the network based on a user profile, if the client device is assigned to the at least one third access zone.

9. The method according to claim 1, wherein:
the client device connects to the network via a network element that is controlled by an access controller; and
the access controller maintains a persistent connection with the network element, thereby facilitating a prompt assignment or reassignment of the client device to one of the plurality of access zones.

10. The method according to claim 1 wherein:
the network is a virtual private network; and
each of the plurality of access zones is a virtual local area network (VLAN).

11. The method according to claim 1, further comprising: causing the client device to obtain a network address based on the access zone the client device is assigned to.

12. The method according to claim 11, further comprising:
blocking the client device's requests for any new network address;
causing the client device to initiate a request for a new network address and to retry the request upon rejection:
associating the new network address with the access zone the client device is assigned to; and
allowing the client device's request for the new network address to proceed.

13. The method according to claim 1, wherein the plurality of access zones in the network are established for client devices having different levels of authentication and security assessment requirements.

14. The method of claim 1 wherein clients in said first access zone have traffic limited to only traffic necessary for authentication purposes and wherein clients in said second access zone have traffic limited to only traffic necessary for remediation purposes.

15. A system for providing secure network access, the system comprising: an access controller and at least one access device coupled to a network, wherein:
the access controller establishes a plurality of access zones in the network, wherein client devices assigned to different access zones have different access privileges and are isolated from one another, wherein the plurality of access zones are selected from a group consisting of:
at least one first access zone for client devices that have not been authenticated;
at least one second access zone for client devices that are authenticated but not fully trusted; and
at least one third access zone for client devices that are authenticated and fully trusted;
a client device connects to the network through the at least one access device; and
the access controller coordinates with the at least one access device to assign the client device to one of the plurality of access zones based on an authentication of the client device, an assessment of a security context associated with the client device, and the client device's connection to the network, wherein the assessment of the security context is performed at least in part by an agent program in the client device to determine an access privilege of the client device and the assessment of the security context is performed prior to the authentication of the client device, and wherein network traffic associated with the client device is filtered for remediation messages only if the client device is assigned to the at least one second zone, wherein said remediation messages comprise security patches and antivirus definitions.

16. The system according to claim 15, wherein the access controller causes a filter to be applied to network traffic associated with the client device based at least in part on the access zone the client device is assigned to.

17. The system according to claim 15, wherein the access controller causes the client device to be reassigned to another access zone in response to one or more triggering events, wherein the one or more triggering events are selected from a group consisting of:
a change in the security context;

a security violation associated with the client device;
a security violation detected in the network; and
an operator-initiated request to reassign the client device to another access zone.

18. The system according to claim 15, wherein the agent program in the client device is downloaded from the access device to the client device.

19. The system according to claim 15, wherein the access controller maintains a persistent connection with the network element, thereby facilitating a prompt assignment or reassignment of the client device to one of the plurality of access zones.

20. The system according to claim 15, wherein:
the network is a virtual private network; and
each of the plurality of access zones is a virtual local area network (VLAN).

21. The system according to claim 15, further comprising a captive web portal, wherein any unauthorized request from the client device redirected to an authentication page served by the captive web portal.

22. The system according to claim 15, wherein the access controller is not specific to any access technology employed by the client device.

23. The system of claim 15 wherein clients in said first access zone have traffic limited to only traffic necessary for authentication purposes and wherein clients in said second access zone have traffic limited to only traffic necessary for remediation purposes.

* * * * *